(12) United States Patent
Hoesl

(10) Patent No.: US 10,968,873 B2
(45) Date of Patent: Apr. 6, 2021

(54) HYDROCARBON ADSORBER APPARATUS AND FIXATION METHOD THEREOF

(71) Applicant: MANN+HUMMEL GmbH, Ludwigsburg (DE)

(72) Inventor: Mathias Hoesl, Marklkofen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 16/435,605

(22) Filed: Jun. 10, 2019

(65) Prior Publication Data
US 2020/0386197 A1 Dec. 10, 2020

(51) Int. Cl.
| | | |
|---|---|---|
| *F02M 35/02* | (2006.01) | |
| *F02M 35/10* | (2006.01) | |
| *B01D 53/04* | (2006.01) | |
| *B29C 65/60* | (2006.01) | |
| *B29C 65/08* | (2006.01) | |
| *B29L 31/00* | (2006.01) | |

(52) U.S. Cl.
CPC ..... *F02M 35/0218* (2013.01); *B01D 53/0407* (2013.01); *B29C 65/08* (2013.01); *B29C 65/609* (2013.01); *F02M 35/1036* (2013.01); *B01D 2253/102* (2013.01); *B01D 2257/7022* (2013.01); *B01D 2259/4516* (2013.01); *B29L 2031/7492* (2013.01)

(58) Field of Classification Search
CPC ............ F02M 35/0218; F02M 35/1036; B29C 65/609; B29C 65/08; B01D 53/0407; B01D 2253/102; B01D 2257/7022; B01D 2259/4516; B29L 2031/7492
See application file for complete search history.

(56) References Cited

U.S. PATENT DOCUMENTS

| | | | |
|---|---|---|---|
| 3,461,771 A * | 8/1969 | Briles | ................. F16B 19/1054 411/34 |
| 7,344,586 B2 | 3/2008 | Zulauf et al. | |
| 7,473,306 B2 | 1/2009 | Uemura et al. | |
| 7,507,279 B2 | 3/2009 | Mizutani et al. | |
| 7,699,912 B2 | 4/2010 | Uemura et al. | |
| 8,262,785 B2 | 9/2012 | Barron | |
| 9,624,877 B2 | 4/2017 | Weckerle | |
| 2016/0244234 A1* | 8/2016 | Mayer | ................. A61B 50/3001 |
| 2016/0250804 A1* | 9/2016 | Wang | .................. B29C 66/8322 403/267 |
| 2018/0149119 A1* | 5/2018 | Morikawa | ........ F02M 35/10386 |

FOREIGN PATENT DOCUMENTS

| | | | |
|---|---|---|---|
| CN | 207454135 U | 6/2018 | |
| WO | WO-9722401 A1 * | 6/1997 | ......... B01D 53/8668 |
| WO | WO-02089723 A2 * | 11/2002 | ....... A61B 5/150022 |

* cited by examiner

*Primary Examiner* — Jacob M Amick
*Assistant Examiner* — Charles Brauch
(74) *Attorney, Agent, or Firm* — James Hasselbeck

(57) ABSTRACT

The present invention is directed to the use of an improved hydrocarbon adsorption system for the treatment of evaporative emissions from a motor vehicle. More specifically, the system includes one or more hydrocarbon adsorption elements being housed within a frame, the frame being permanently affixed within the air intake housing of engine.

19 Claims, 10 Drawing Sheets

HYDROCARBON ADSORBER APPARATUS AND FIXATION METHOD THEREOF

FIELD OF THE INVENTION

This invention is directed to an apparatus and associated method for controlling evaporative hydrocarbon emissions from motor vehicles. More specifically, this invention is directed to a device configured to allow for hydrocarbon adsorption within a motor vehicle's air intake and filtration housing to allow the capture of any evaporative fuel emissions before they are released to the atmosphere.

BACKGROUND OF THE INVENTION

New evaporative emission regulations for vehicles, particularly in the United States and China, require the control of polluting substances, primarily hydrocarbons, from the vehicle as the vehicle sits in an idle state. Evaporative emissions can leak out of a vehicle from many sources including the air intake system, fuel tank, and exhaust gas recirculation (EGR) system. In the past, only the evaporative emissions from the fuel tank and fuel delivery system were captured, such as with carbon-filled canisters. However, with increasing emission regulations it has become necessary to expand evaporative emission capture technology to other vehicle components such as the air intake system.

It has been found that a significant amount of volatile hydrocarbons from several sources collect in the air intake system of the automobile engine after the engine has been shut off. These hydrocarbons can then leak into the atmosphere after the engine has been shut off as the engine is no longer drawing air through the air intake system and these gasses can then escape backwards through the air intake system. Due to regulations, the mitigation systems regulating the escape of these hydrocarbons is required to be provided in a permanently affixed manner within the air intake to prevent removal of the mitigation system and thus ensure continued future regulation or reduced emissions by such systems. Prior art systems have relied on overmolding of adsorbent material within the housing or onto various components which overmolding methods result in excessively high fabrication costs.

In particular, prior art application CN207454135U teaches an adsorption assembly with a removable adsorption media for adsorbing hydrocarbon gasses and U.S. Pat. No. 9,624,877B also teaches a similar adsorption assembly with a removable adsorption media for adsorbing hydrocarbon gasses. However, both of these recited references teach structures which allow for the removal of the adsorbent material which is becoming impermissible through government regulation.

SUMMARY OF THE INVENTION

In order to prevent the escape of hydrocarbons into the atmosphere and ensure proper permanent installation of long-term prevention of escape of said gasses, contemplated herein is an engine air intake system, the system including a housing, the housing including an inlet and an outlet, the outlet being configured to be affixed to an intake of an engine. An adsorbent material can then be provided and a frame containing the adsorbent material, the frame being permanently affixed to an interior of the housing between the inlet and the outlet. The placement of the frame and adsorbent material can then be placed in such a manner that any air escaping from the outlet in a reverse flow condition is configured to come into contact with the adsorbent material contained within the frame such that hydrocarbons contained in the air are adsorbed by the adsorbent material. The frame can then be affixed within the housing in a manner wherein removal of the adsorbent material from the frame or of the frame from the housing would result in destruction of the frame or housing.

In some alternative embodiments the frame can be provided having a first portion and a second portion which can provided as separable and interfacing parts, and in some instances be rotationally connected to one another about a corresponding edge wherein the corresponding edge can function as a hinge, i.e. either include a hinge component or be provided as a film hinge. In some such embodiments the first portion can be provided with an open support matrix provided across a surface thereof, wherein the open support matrix can be configured to provide structural support to the adsorbent material while allowing contact between the adsorbent material and air passing thereby.

In some additional embodiments the frame can be provided with a plurality of corresponding apertures provided about a perimeter edge, about a flange, or about an opposing edge of the first portion and an opposing edge of the second portion. In some embodiments the opposing edge can be located opposite the corresponding edge having the hinge capability or function. In some such embodiments, the housing can then include one or more pins configured to extend through the one or more apertures in a closed configuration wherein each of the one or more pins can then be heat staked or otherwise deformed so as to mushroom a distal end of each pin and thus create an associated interfering lip which cannot pass through or otherwise forms an interference fit with each associated one or more corresponding aperture.

In some alternative embodiments, one or more edges, i.e. an opposing edge of the first portion and an opposing edge of the second portion can be welded into an interior of the housing with the frame being in a closed position.

In some embodiments the frame can be sized and placed within the housing in such a manner that it extends about an entire interior perimeter of the housing thus completely separating the inlet from the outlet. However, in some alternative embodiments the frame can instead be sized and placed within the housing in such a manner that the frame extends only about a portion of an interior perimeter of the housing thus providing a free bypass between the inlet and the outlet.

Also contemplated herein is an adsorber containment and support system being provided independently from any particular housing, such a system can include any of the features of the frame and adsorbent material as discussed herein.

Also contemplated herein are various methods of providing or using such systems, and particularly contemplated herein is a method of providing an adsorber within an engine air intake system, wherein the method can include the steps of: providing a housing, the housing including an inlet and an outlet, the outlet being configured to be affixed to an intake of an engine; providing a frame, the frame having a first portion and a second portion being rotationally connected to one another about a corresponding edge; providing an adsorbent material; placing the adsorbent material into a cavity formed within the frame; affixing the frame to an interior of the housing between the inlet and the outlet in a permanent manner, wherein air escaping from the outlet in a reverse flow condition is configured to come into contact with the adsorbent material contained within the frame such that hydrocarbons contained in the air are adsorbed by the adsorbent material; wherein the adsorbent material is contained in the frame in such a manner that removal of the adsorbent material from the frame would result in destruction of the frame or housing.

In some such embodiments the housing can then similarly include one or more pins configured to extend through one or more apertures provided about a perimeter portion of the frame while the frame is in a closed configuration, wherein the method further includes a step of: heat staking each of the one or more pins so as to mushroom a distal end thereof and thus create an interfering lip of each of the one or more pins which cannot pass through an associated one or more corresponding aperture. Or alternatively the method can include a step of: welding an opposing edge of the first portion and an opposing edge of the second portion into an interior of the housing with the frame being in a closed position.

These aspects of the invention are not meant to be exclusive and other features, aspects, and advantages of the present invention will be readily apparent to those of ordinary skill in the art when read in conjunction with the following description, appended claims, and accompanying drawings. Further, it will be appreciated that any of the various features, structures, steps, or other aspects discussed herein are for purposes of illustration only, any of which can be applied in any combination with any such features as discussed in alternative embodiments, as appropriate.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention, wherein.

DETAILED DESCRIPTION OF THE INVENTION

Figure 1:
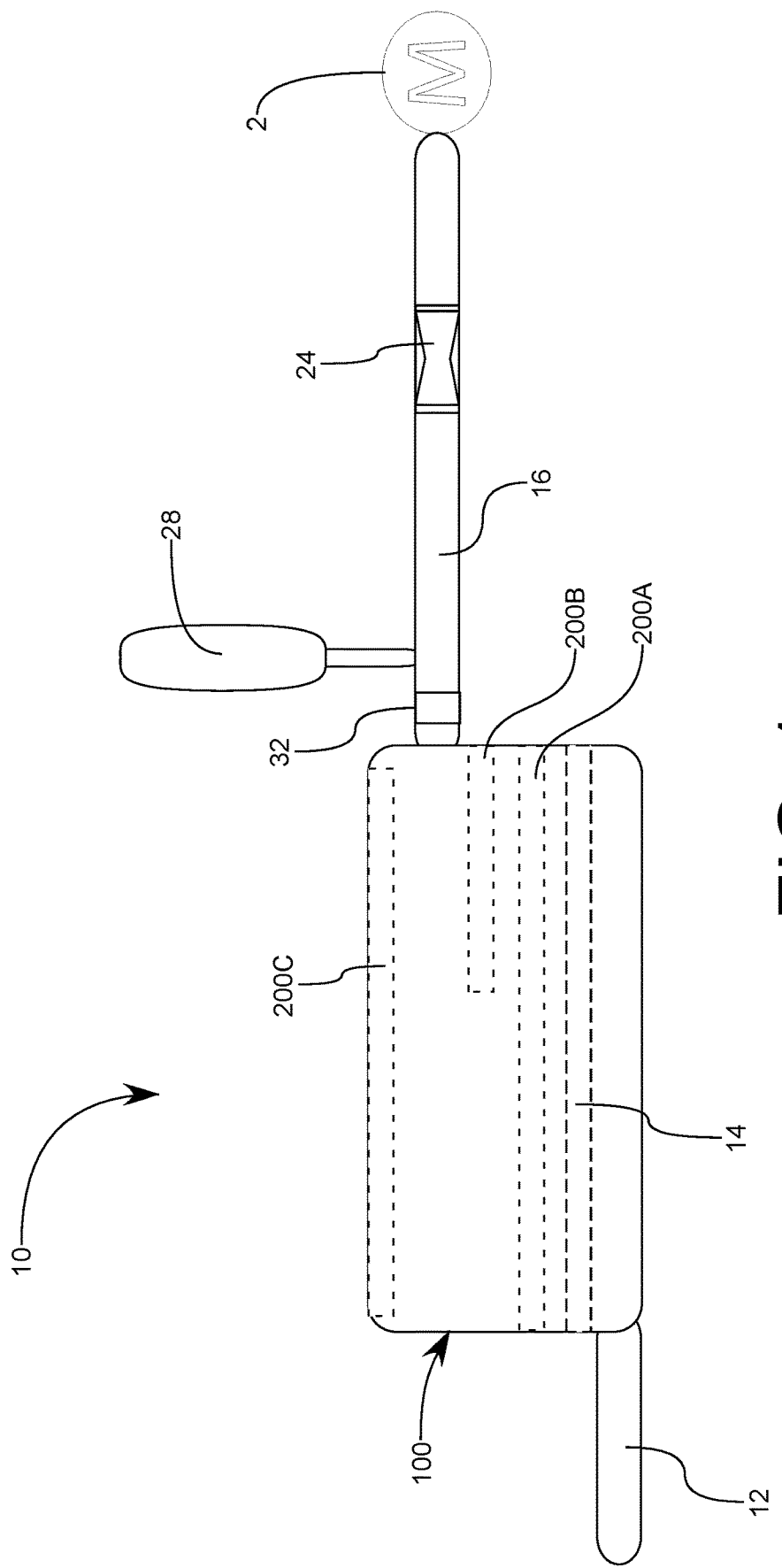
FIG. 1 illustrates a side cross sectional schematic of an exemplary air intake system illustrating various optional configurations for various hydrocarbon traps provided therein.

The embodiments set forth below represent the necessary information to enable those skilled in the art to practice the embodiments and illustrate the best mode of practicing the embodiments. Upon reading the following description, and in light of the accompanying drawing figures, those skilled in the art will understand the concepts of the disclosure and will recognize applications of these concepts not particularly addressed herein. It will then be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or other structure is referred to as being "on" or extending "onto" another element, it can be directly on or extend directly onto the other element or intervening elements may also be present. In contrast, when an element is referred to as being "directly on" or extending "directly onto" another element, there are no intervening elements present.

Likewise, it will be understood that when an element such as a layer, region, or material is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

It will be appreciated by those having skill in the area of air filtration, and particularly in the field of engine air filtration, that various operation modes and environments can often require widely varying filtration needs and airflow requirements which can thus require corresponding variations in filter media specifications.

Accordingly, while the present disclosure will be discussed in detail with regard to hydrocarbons escaping from the engine, throttle body, combustion chambers, etc., that the concepts discussed herein can be similarly applied to capture alternative harmful gasses or vapors in alternative systems without departing from the inventive concepts conveyed herein.

As such, in order to prevent the escape of hydrocarbons into the atmosphere and ensure proper longer proper installation of long-term prevention of escape of said gasses, and as illustrated in FIG. 1, is an engine air intake system 10, the engine air intake system 10 including a housing assembly 100, the housing including an inlet 12 and an outlet 16, the outlet 16 being configured to be affixed to an intake of an engine 2.

It will then be understood that in some systems the engine air intake system 10 can also include mass airflow sensor 32, a resonator 28, and a throttle body 24, or any other necessary components for engine operation, wherein the throttle body 24 can be responsible for controlling air volume, or for mixing of fuel and air, for delivery to the motor 2.

As is typical the housing assembly 100 can be provided with a particulate filtration media 14 configured to remove entrained particulates from the air. An adsorbent material 200A/B/C can then be provided within the air intake system 10. As illustrated here, it is often advantageous to provide the particulate filtration media 14 upstream from the adsorbent material such that the adsorbent material is not exposed to particulates which may eventually clog apertures provided through the adsorbent material. It will then be understood that the adsorbent material is not, and should not be, utilized for particulate removal, because, as will be discussed in more detail below, the adsorbent material is intended to be permanently affixed within the housing assembly 100 and clogging thereof may cause performance reduction which may ultimately require full replacement of the entire housing assembly 100.

As illustrated here, the adsorbent material can be provided in a plurality of configurations, a first configuration, as represented by 200A can include a situation in which the adsorbent material 200A extends about an entire internal circumference of the housing assembly 100 between the inlet 12 and the outlet 16 such that all air passing between the inlet 12 to the outlet 16 must pass through the adsorbent material 200A. In particular, in this application, when the engine is turned off after having been operating, fuel will often be retained within the throttle body or within the combustion chambers of the engine, which fuel may then evaporate and escape backwards through the engine air intake system 10. This configuration is advantageous because any such fumes or gasses will be adsorbed by the adsorbent material. It will be appreciated that many adsorbent materials may be used herein, but for purposes of illustration can particularly include an activated carbon element.

In one aspect of the present invention, a frame is provided which is configured to contain the adsorbent material, this frame is illustrated particularly in FIGS. 2-10, the frame 300 is then configured to be permanently affixed to an interior of the housing 100, and in some instances between the inlet and the outlet. The placement of the frame and adsorbent material can then be provided in such a manner that any air or gasses escaping from the outlet in a reverse flow condition are configured to come into contact with the adsorbent material 200 contained within the frame 300 such that hydrocarbons contained in the air are adsorbed by the adsorbent material. The frame can then be affixed within the housing in a manner wherein removal of the adsorbent material 200 from the frame 300, or removal of the frame 300 from the housing 100 would result in destruction of the frame 300 or housing 100.

Figure 2A:
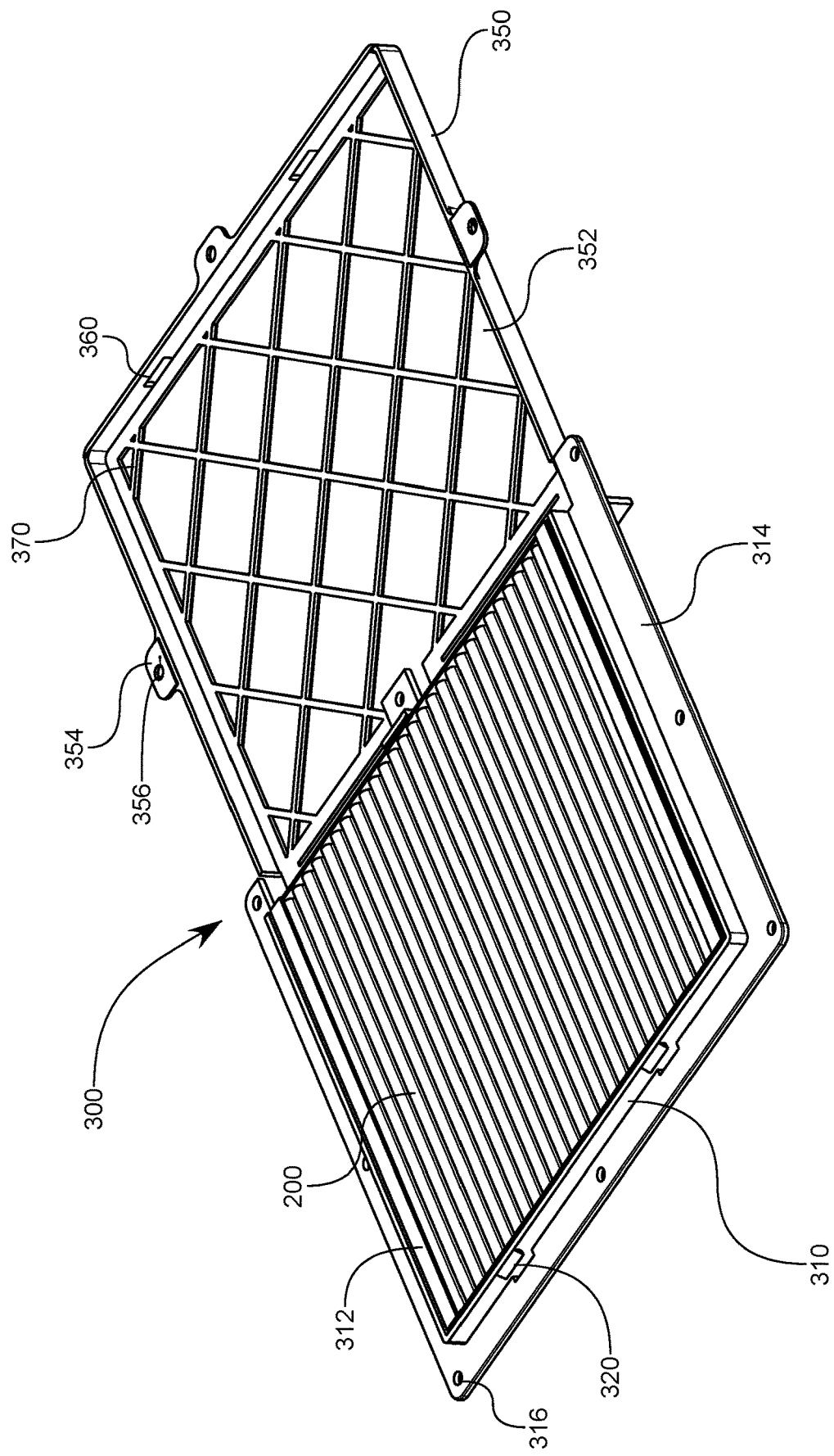
FIG. 2A illustrates a side perspective view of an exemplary embodiment of a frame configured to contain a hydrocarbon trap material in an open configuration the frame being configured for use in and affixation within an exemplary vehicle air intake housing in accordance with various aspects of the present invention.
Figure 2B:
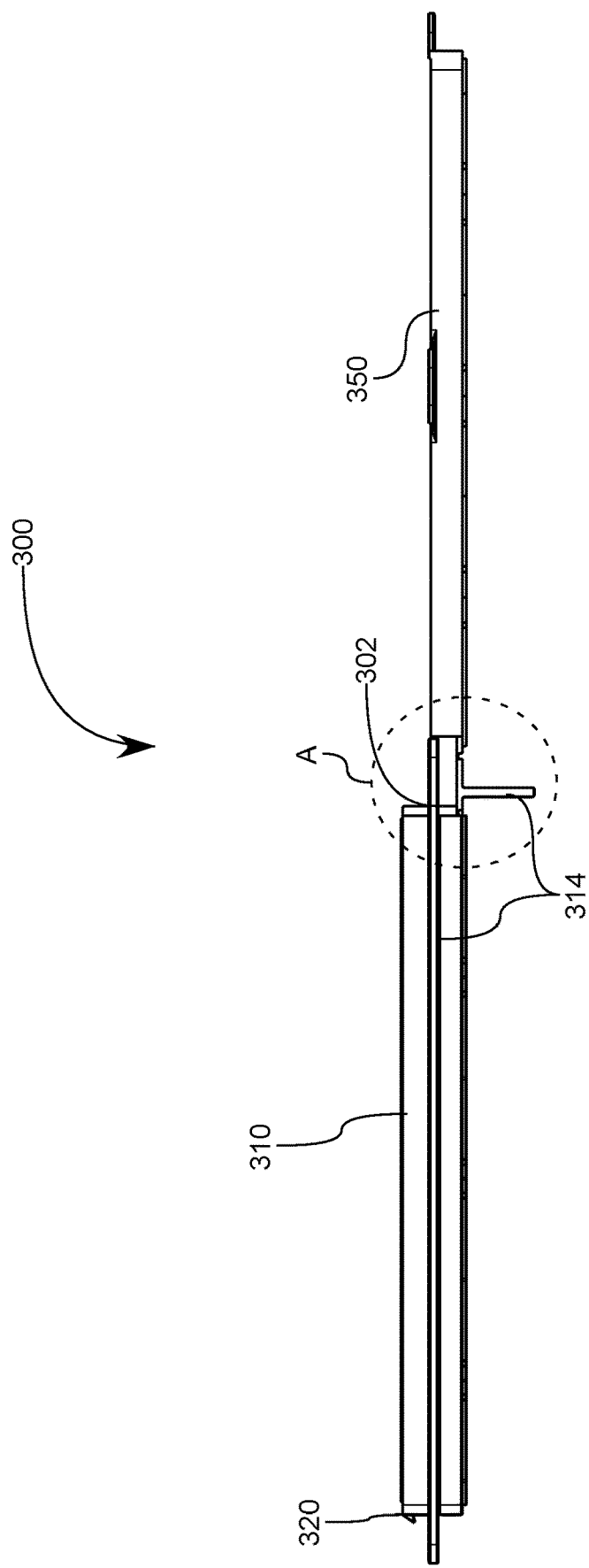
FIG. 2B illustrates a side view of the exemplary embodiment of a frame configured to contain a hydrocarbon trap material of FIG. 2A in an open configuration the frame being configured for use in and affixation within an exemplary vehicle air intake housing in accordance with various aspects of the present invention.
Figure 3:
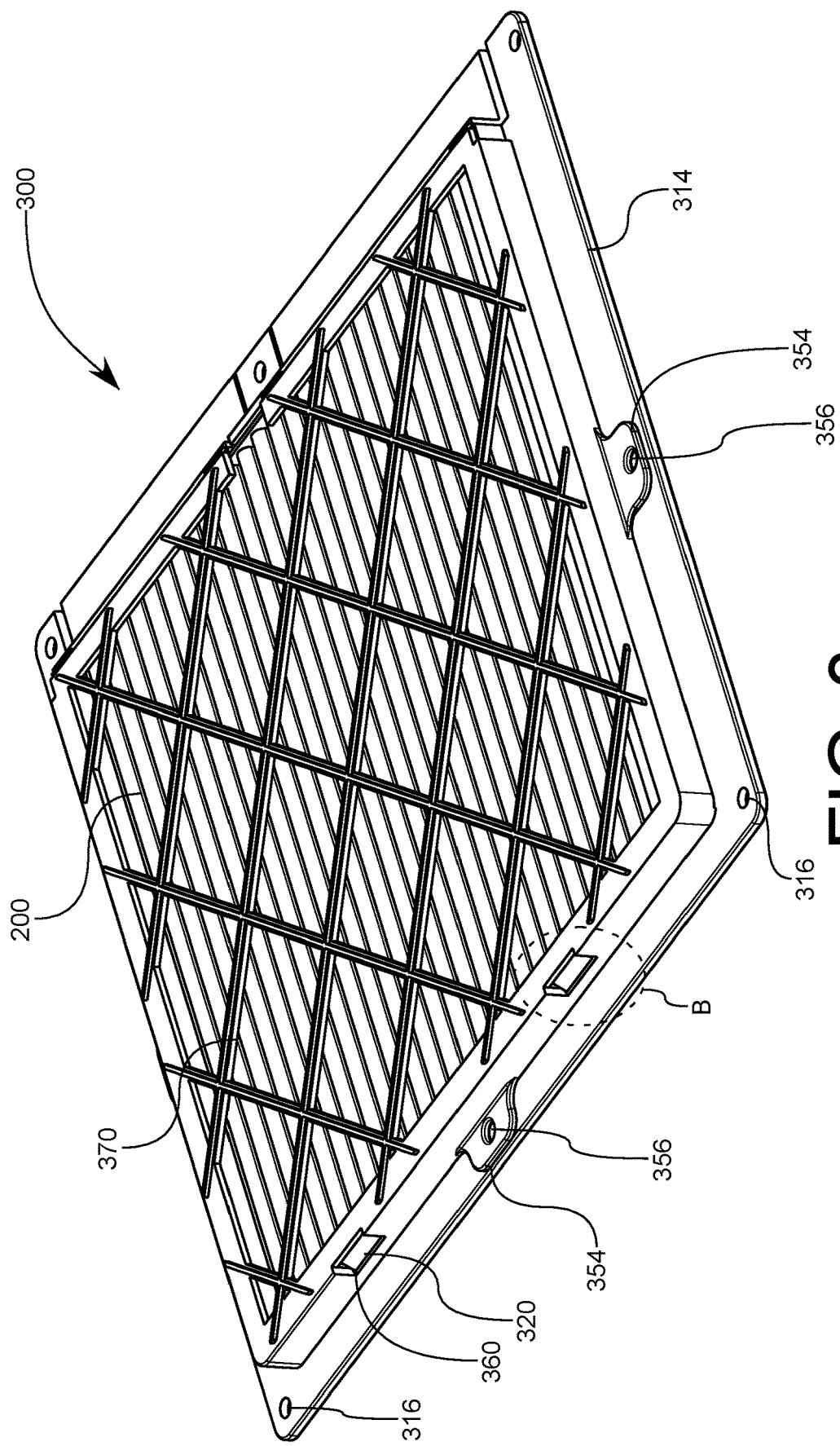
FIG. 3 illustrates a side perspective view of an exemplary embodiment of the frame and hydrocarbon trap material of FIG. 2 in closed configuration in accordance with various aspects of the present invention.
Figure 4:
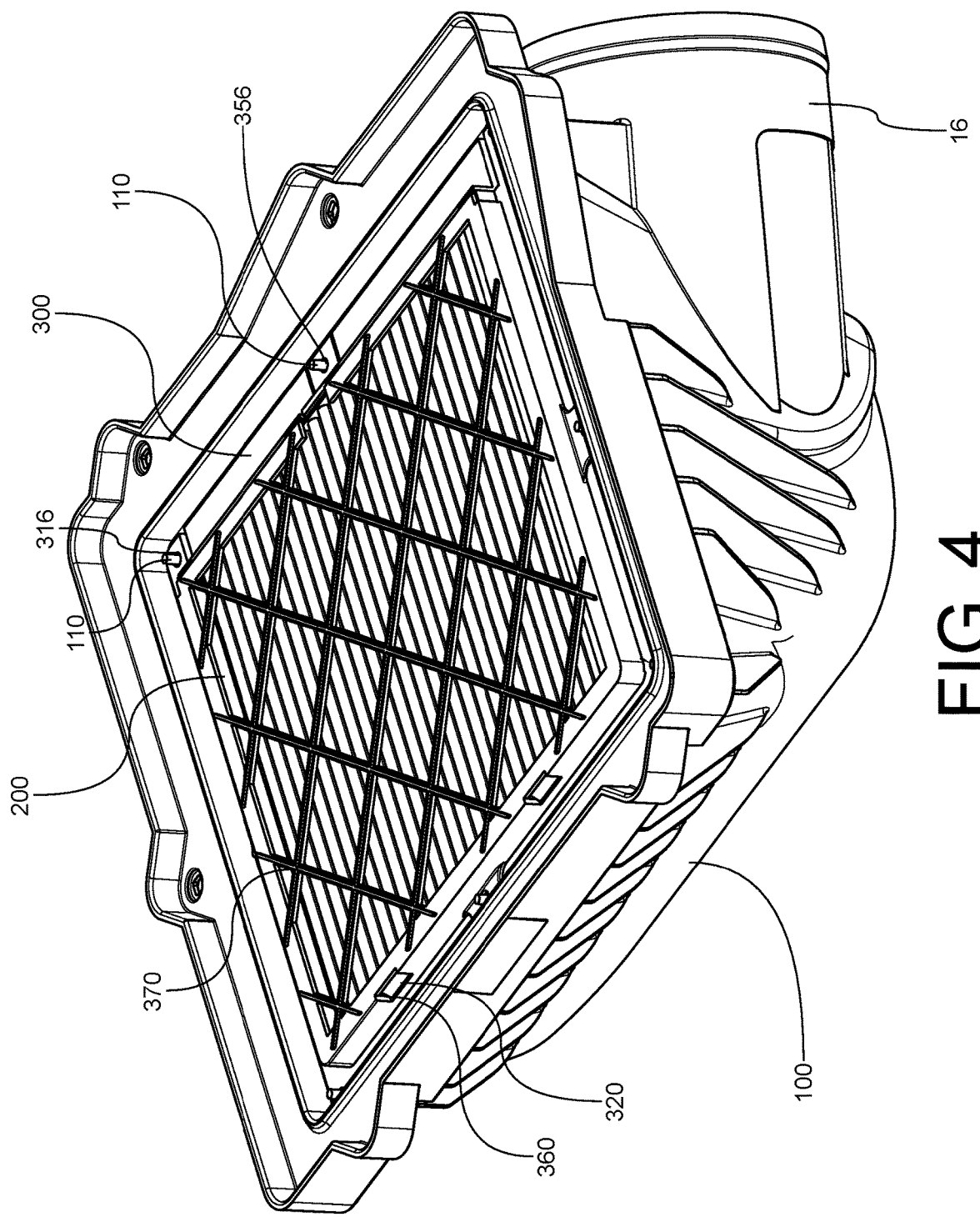
FIG. 4 illustrates a bottom side perspective view of a frame and hydrocarbon trap material of FIGS. 2-3 as provided within an air intake or filtration housing in accordance with various aspects of the present invention.
Figure 5:
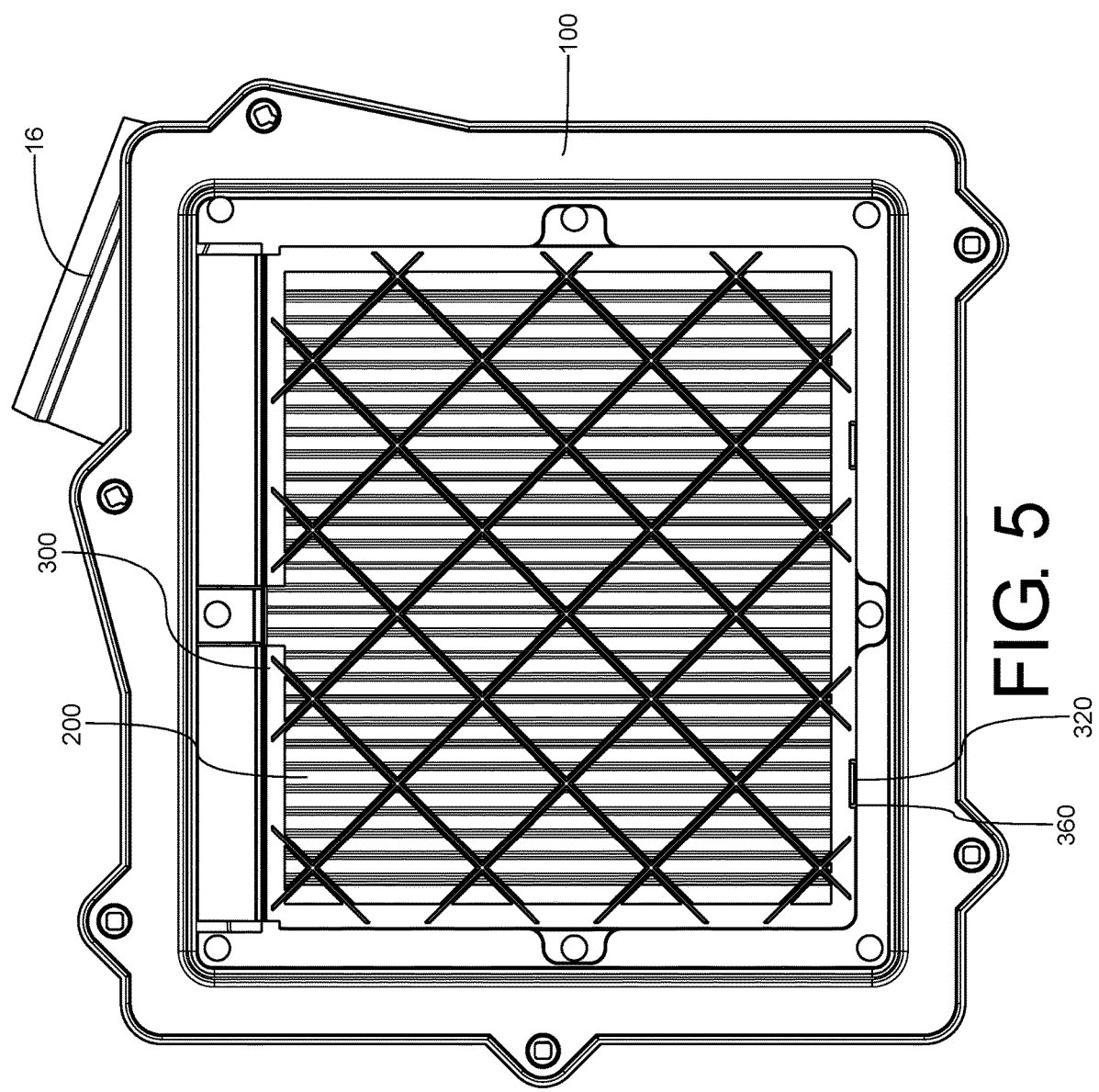
FIG. 5 illustrates a bottom view of the air intake housing having the frame and hydrocarbon trap of FIGS. 2-3 being illustrative of various aspects of the present invention.
Figure 6:
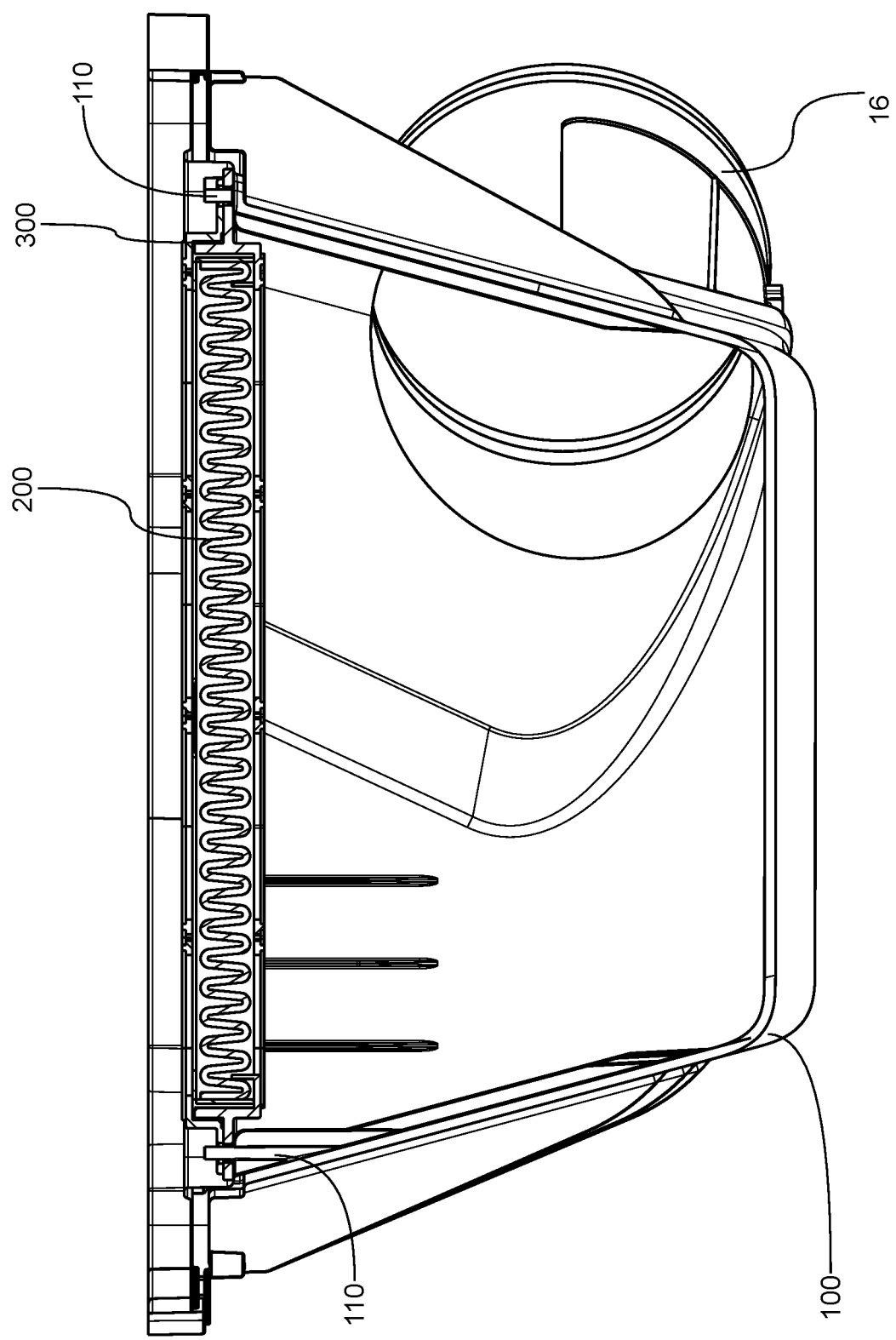
FIG. 6 illustrates a side cross-sectional view of the air intake housing having the frame and hydrocarbon trap of FIGS. 2-3 in an unaffixed state being illustrative of various aspects of the present invention.
Figure 7:
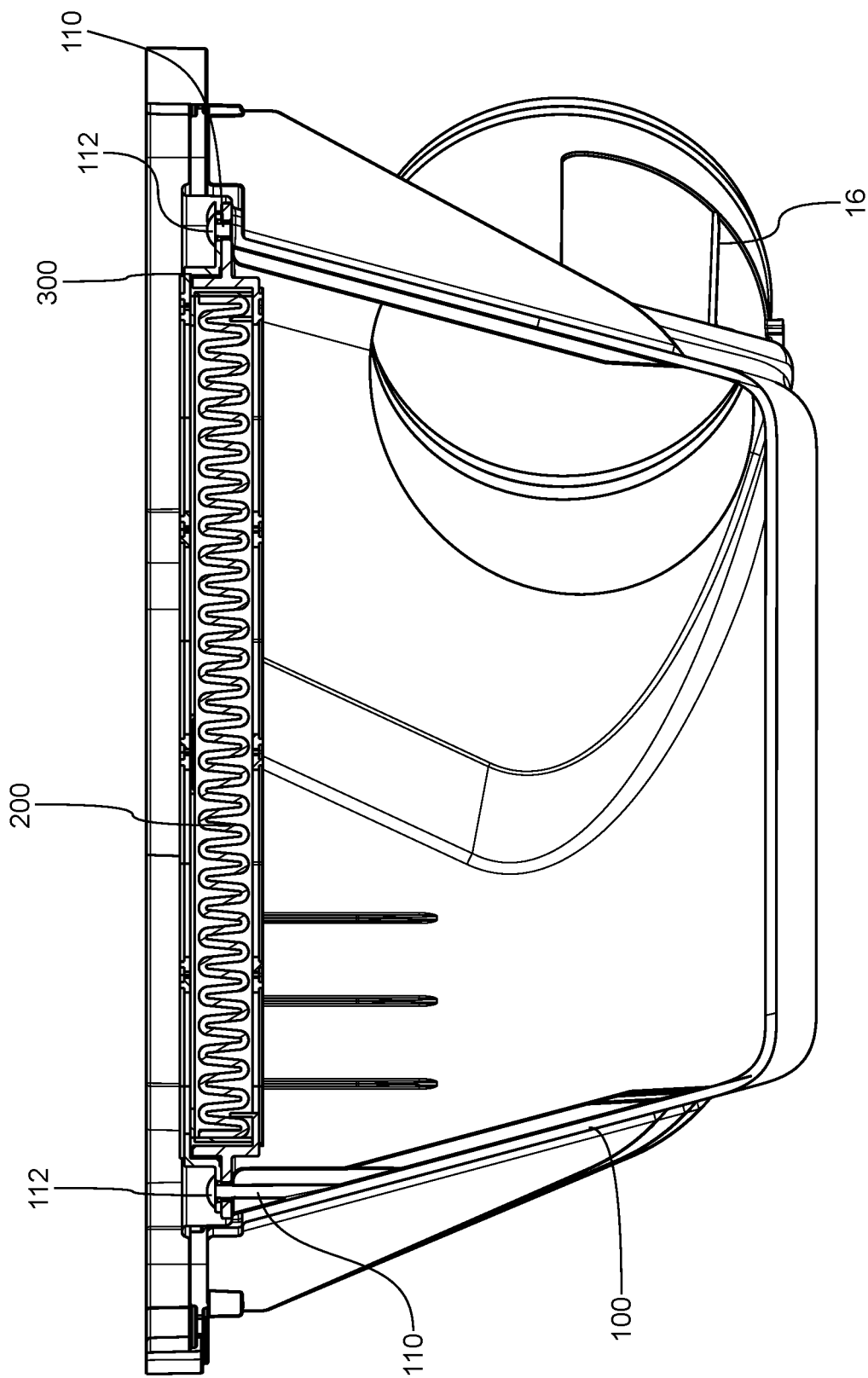
FIG. 7 illustrates a side cross-sectional view of the air intake housing having the frame and hydrocarbon trap of FIGS. 2-3 in an exemplary affixed state being illustrative of various aspects of the present invention.

In some alternative embodiments, and as particularly illustrated in FIGS. 2-3, the frame 300 can be provided having a first portion 310 and a second portion 350 which can be provided separately, however, in some instances, and as shown, these components can be rotationally connected to one another about a corresponding edge 302. This corresponding edge 302 can function as a hinge, i.e. either include a hinge component or be provided as a film hinge as shown. It will be understood that FIGS. 2A-B illustrate the frame in an open configuration wherein the second portion 350 is rotated away to allow insertion of the adsorbent material 200 thereinto. This rotated away configuration as shown causes a portion of the perimeter or flange portion 214 to rotate downward as well, but as can be seen in FIG. 3, in the closed position, this flange portion 214 rotates up to be flush with the rest of the flange about the remainder of the perimeter.

As shown, the first portion 310 can include a cavity 312 which is encased when the second portion 350 is rotated about the corresponding edge so as abut against the first portion 310 about a perimeter thereof. Alternatively, the second portion 350 can also have a corresponding cavity 352, or a portion a total cavity, wherein the containment area for the adsorbent material is formed when the effective clam-shell structure of the first portion 310 and the second portion 350 are rotated so as to abut against one another along the perimeter thereof.

In some embodiments, and as shown in FIGS. 2A, 3-5, and 8 the first portion 310 of the frame 300 can be provided with an open support matrix provided across a surface thereof, wherein the open support matrix 370 which can be configured to provide structural support to the adsorbent material while allowing contact between the adsorbent material and air passing thereby. As illustrated herein, the support matrix 370 can be provided as a latticework of ribs which provide structural support for the adsorbent material contained within the frame 300.

It will be appreciated that the adsorbent material can be provided of a wide variety of known materials tailored to remove a particular noxious gas or contaminant. However, in some instances such material, in a given porosity, or having a desired aperture size may have a corresponding reduction in self-sustaining structure. This support matrix 370 thus allows for a proper amount of structural support thus allowing for increased aperture size wherein the adsorbent material can rely on the support matrix for structural support rather than the inherent structural strength of the adsorbent material itself. The support matrix illustrated herein is a latticework of ribs, however this support could also be provided as a wire mesh, grid, or any other suitable and primarily open structure.

It will also then be appreciated that the adsorbent material 200 is intended to adsorb noxious gasses and not provide particulate filtration. Further, in order to maximize performance, the aperture or pore size of the material is intended to be as wide or large as possible so as to minimize the pressure differential across the filtration housing assembly 10 and thus allow for maximum airflow to the engine or motor affixed thereto.

In some additional embodiments the frame 300 can be provided with a plurality of corresponding apertures 316 provided about a perimeter edge, such as about a flange 314, or about an opposing edge of the first portion and an opposing edge of the second portion. In some embodiments the opposing edge can be located opposite the corresponding edge having the hinge capability or function. In some embodiments, such as shown in FIGS. 2-5, the second portion 350 can have a plurality of tabs 354, or a similar flange, having a plurality of apertures 356 provided therethrough. In this manner when the first component 310 and the second component 350 frame 300 are then rotated with respect to one another into the closed position at least some of the apertures 356 of the second portion 350 line up with at least some of the apertures 316 provided in the first portion 310.

In particular, these apertures provided on the first and second portions which are lined up provide a means by which the frame 300 can be permanently affixed to the housing 100. As illustrated in FIGS. 4-7, the housing 100 can then include one or more pins or posts 110 which are placed in such a manner, and provided with sufficient length so as to extend through at least one of the one or more aligned apertures so as to secure the relative position between the frame 300 and the housing 100. Then a portion of each pin 110 can then be heat staked or otherwise deformed so as to mushroom a distal end of each pin and thus create an associated interfering lip 112 which cannot pass through the apertures or otherwise forms an interference fit with each associated one or more corresponding aperture through which the pin 110 extends. While the pins 110 are discussed herein as being heat staked, it will be appreciated that alternative methods can also be utilized to provide such a permanent relative positioning, such as riveting, welding, etc. Further, the relative location of the pins and the corresponding apertures can be reversed wherein the pins 110 can instead be provided about the frame 300 and then they can be deformed on opposing sides through apertures provided in the housing 100.

Figure 8:
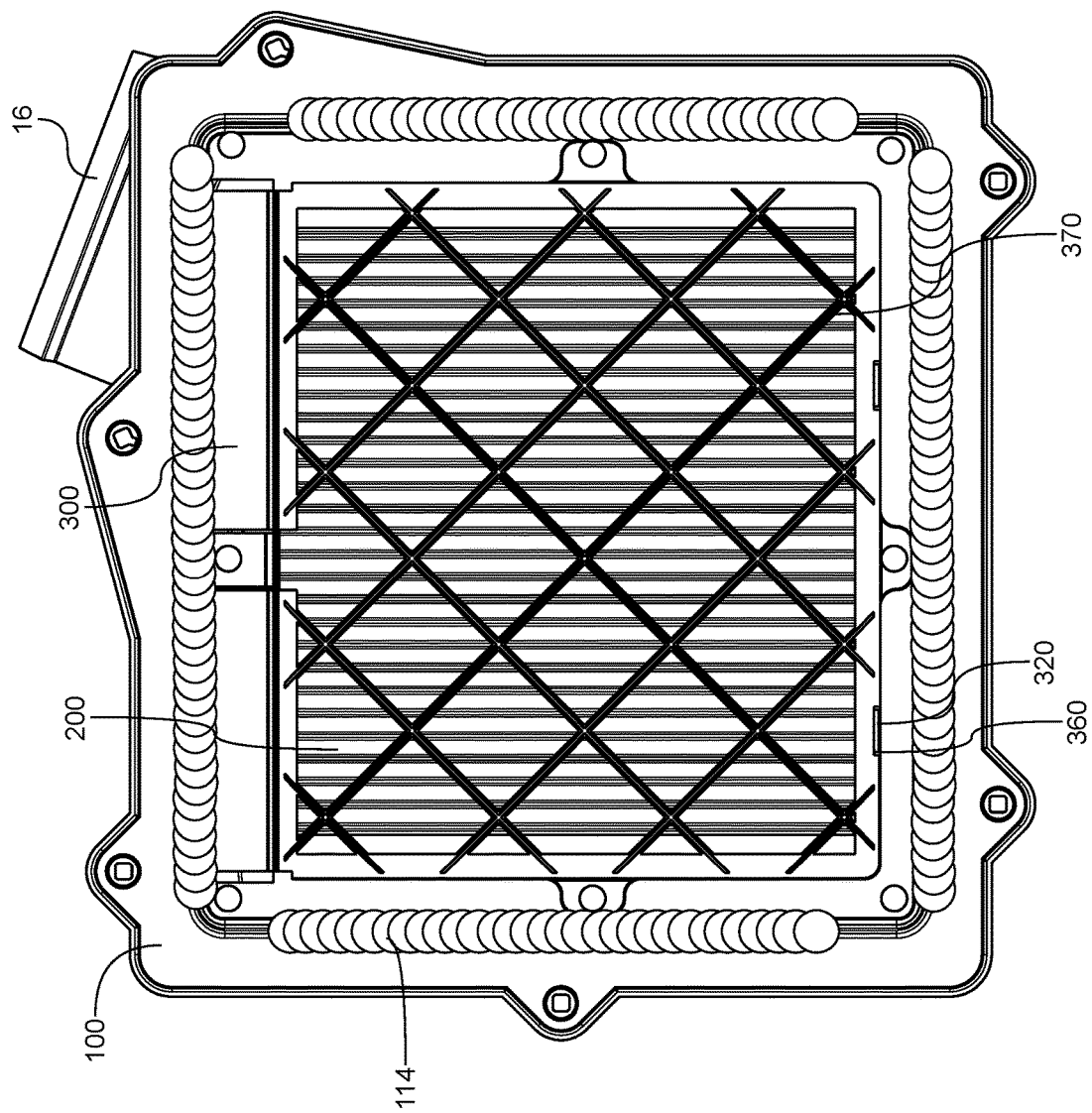
FIG. 8 illustrates a bottom open view of the air intake housing having the frame and hydrocarbon trap of FIGS. 2-3 in an alternative exemplary affixed state being illustrative of various aspects of the present invention.
Figure 10:
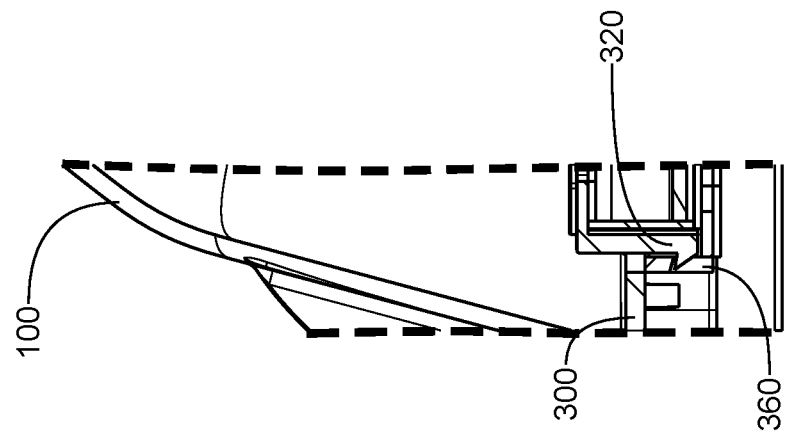
FIG. 10 illustrates a zoomed side cross-sectional view of the area B from FIG. 3 illustrating an exemplary securement feature between a first and second portion of the frame in a closed configuration in accordance with various aspects of the present invention.
Figure 9:
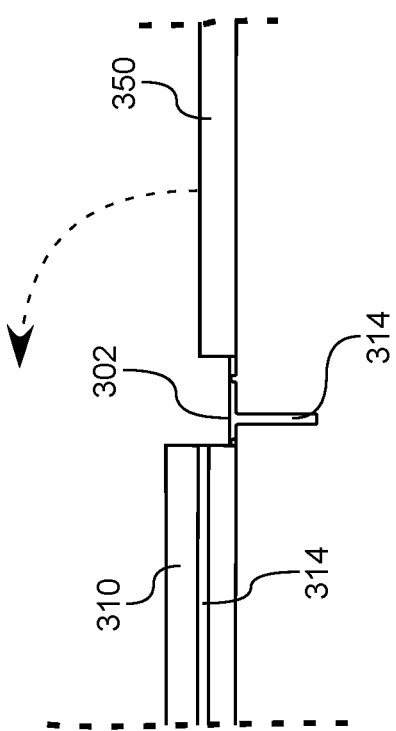
FIG. 9 illustrates a zoomed side cross-sectional view of the area A from FIG. 2B illustrating an exemplary hinge between a first and second portion of the frame in an open configuration in accordance with various aspects of the present invention.

In some alternative embodiments, such as shown in FIG. 8, one or more edges of the frame 300, i.e. an opposing edge of the first portion and an opposing edge of the second portion, can be welded into an interior of the housing 100 with the frame 300 being in a closed position during the welding process. It will then be appreciated that the weld should be of sufficient width so as to affix both the first portion 310 and the second portion 350 in the closed position as well as affix the frame 300 to the interior of the housing.

In some embodiments the frame can be sized and placed within the housing in such a manner that it extends about an entire interior perimeter of the housing thus completely separating the inlet from the outlet. However, in some alternative embodiments the frame can instead be sized and placed within the housing in such a manner that the frame extends only about a portion of an interior perimeter of the housing thus providing a free bypass between the inlet and the outlet or in a top or bottom portion not separating the inlet from the outlet such that air only passes over, and not through the adsorbent material.

Also contemplated herein is an adsorber containment and support system being provided independently from a particular housing, such a system can include any of the features of the frame and adsorbent material as discussed herein and then be configured to be affixed in a permanent manner into any one of a given housing through known methods.

In some additional embodiments, the frame 300 can also be provided with an additional securing means for ensuring the first portion 310 and the second portion 350 are properly retained in the closed position, particularly during the securing to the housing process. Such a means can include a locking mechanism which can include an aperture 360 and a corresponding barb 320 wherein the barb enters into the aperture upon entering the closed position and then is in an interference or snap fit with a lip portion of the aperture. This locking mechanism can then serve to prevent the first and second portions from separating while heat staking the pins or during a welding process.

Also contemplated herein are various methods of providing or using such systems, and particularly contemplated herein is a method of providing an adsorber within an engine air intake system, wherein the method can include the steps of: providing a housing, the housing including an inlet and an outlet, the outlet being configured to be affixed to an intake of an engine; providing a frame, the frame having a first portion and a second portion being rotationally connected to one another about a corresponding edge; providing an adsorbent material; placing the adsorbent material into a cavity formed within the frame; affixing the frame to an interior of the housing between the inlet and the outlet in a permanent manner, wherein air escaping from the outlet in a reverse flow condition is configured to come into contact with the adsorbent material contained within the frame such that hydrocarbons contained in the air are adsorbed by the adsorbent material; wherein the adsorbent material is contained in the frame in such a manner that removal of the adsorbent material from the frame would result in destruction of the frame or housing.

In some such embodiments the housing can then similarly include one or more pins configured to extend through one or more apertures provided about a perimeter portion of the frame while the frame is in a closed configuration, wherein the method further includes a step of: heat staking each of the one or more pins so as to mushroom a distal end thereof and thus create an interfering lip of each of the one or more pins which cannot pass through an associated one or more corresponding aperture. Or alternatively the method can include a step of: welding an opposing edge of the first portion and an opposing edge of the second portion into an interior of the housing with the frame being in a closed position.

Various embodiments in this specification have been described in a progressive manner, where descriptions of some embodiments focus on the differences from other embodiments, and same or similar parts among the different embodiments are sometimes described together in only one embodiment.

The heat staking and welding operations discussed herein can be achieved by performing known thermal or ultrasonic methods, and can also include bonding utilizing alternative means such as adhesives or other curing processes insofar as the frame is permanently retained within the housing as well as securing the frame in the closed position.

The adsorbent material can also be provided in any known configuration including in flat or corrugated sheets, in grids, suspensions, etc., and be formed of any suitable material insomuch as the adsorbent material cannot be removed from the frame without destroying it, the frame, or the housing during removal.

Providing the adsorbent material, the frame, and the housing in a separate but permanently affixing them one to another can result in significant reductions in manufacturing costs and assembly costs, particularly when compared to overmolding into the interior of the housing, as has been previously performed.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion within a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, or the device including the element.

The foregoing has provided a detailed description of various embodiments of a multi-modal multi-media filtration system and various principles associated therewith. Specific examples are used herein to describe the principles and implementations of some embodiments. The description is only used to help convey understanding of the possible methods and concepts. Meanwhile, those of ordinary skill in the art may change the specific manners of implementation and application thereof without departing from the spirit of the invention. The contents of this specification therefore should not be construed as limiting the disclosure.

In the descriptions, with respect to unit(s), device(s), component(s), etc., in some occurrences singular forms are used, and in some other occurrences plural forms are used in the descriptions of various embodiments. It should be noted; however, the single or plural forms are not limiting but rather are for illustrative purposes. Unless it is expressly stated that a single unit, device, or component etc. is employed, or it is expressly stated that a plurality of units, devices or components, etc. are employed, the unit(s), device(s), component(s), etc. can be singular, or plural.

Based on various embodiments of the present disclosure, the disclosed apparatuses, devices, and methods may be implemented in other manners. For example, the abovementioned devices can employ various methods of use or implementation as disclosed herein.

Dividing the device into different "regions," "units," or "layers," etc. merely reflect various logical functions according to some embodiments, and actual implementations can have other divisions of "regions," "units," or "layers," etc. realizing similar functions as described above, or without divisions. For example, multiple regions, units, or layers, etc. may be combined or can be integrated into another system. In addition, some features can be omitted, and some steps in the methods can be skipped.

Those of ordinary skill in the art will appreciate that the units, regions, or layers, etc. in the devices provided by various embodiments described above can be provided in the one or more devices described above. They can also be located in one or multiple devices that is (are) different from the example embodiments described above or illustrated in the accompanying drawings. For example, the units, regions, or layers, etc. in various embodiments described above can be integrated into one module or divided into several sub-modules.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to the disclosed aspects of the exemplary embodiments can be made in addition to those described above by a person of ordinary skill in the art having the benefit of the present disclosure without departing from the spirit and scope of the invention contemplated by this disclosure and as defined in the following claims. As such, the scope of this disclosure is to be accorded the broadest reasonable interpretation so as to encompass such modifications and equivalent structures.

I claim:

1. An engine air intake system, the system comprising:
a housing, the housing including an inlet and an outlet, the outlet being configured to be affixed to an intake of an engine;
an adsorbent material;
a frame, the frame including a first portion and a second portion forming a cavity therebetween, the cavity containing the adsorbent material, the frame being permanently affixed to an interior of the housing between the inlet and the outlet,
wherein air escaping from the outlet in a reverse flow condition is configured to come into contact with the adsorbent material contained within the frame such that hydrocarbons contained in the air are adsorbed by the adsorbent material, the first portion and the second portion having a plurality of corresponding apertures;
wherein the housing comprises one or more pins configured to extend through the one or more apertures, the one or more pins configured to be deformed so as to form an interfering lip in an affixed configuration;

wherein the adsorbent material is contained in the frame in such a manner that removal of the adsorbent material from the frame would result in destruction of the frame or housing; and wherein the frame extends only about a portion of an interior perimeter of the housing providing a free bypass between the inlet and the outlet.

2. The engine air intake system of claim 1, wherein the first portion and the second portion of the frame connected to one another about a corresponding edge.

3. The engine air intake system of claim 2, wherein the first portion and the second portion are rotationally connected.

4. The engine air intake system of claim 2, wherein the first portion is provided with an open support matrix provided across a surface thereof, the open support matrix being configured to provide structural support to the adsorbent material while allowing contact between the adsorbent material and air passing thereby.

5. The engine air intake system of claim 2, wherein at least one of the plurality of corresponding apertures is provided about an opposing edge of the first portion and an opposing edge of the second portion, the opposing edge being opposite the corresponding edge.

6. The engine air intake system of claim 1, wherein each of the one or more pins are heat staked so as to mushroom a distal end of each pin and thus create an associated interfering lip which cannot pass through an associated one or more corresponding aperture.

7. The engine air intake system of claim 2, wherein an opposing edge of the first portion and an opposing edge of the second portion are welded into an interior of the housing with the frame being in a closed position.

8. The engine air intake system of claim 2, wherein the corresponding edge of the first portion and the second portion is provided as a film hinge.

9. An adsorber containment and support system, the system comprising:
an adsorbent material;
a frame, the frame including
a first portion and a second portion forming a cavity therebetween,
the cavity containing the adsorbent material,
the frame being permanently affixed to an interior of a housing of an air intake system between an inlet and an outlet,
wherein air escaping from the outlet in a reverse flow condition is configured to come into contact with the adsorbent material contained within the frame such that hydrocarbons contained in the air are adsorbed by the adsorbent material; the first portion and the second portion having a plurality of corresponding apertures which align with one another in a closed configuration;
wherein the frame surrounds and captures the adsorbent material within the frame;
wherein the second portion has a plurality of tabs formed on an outer edges of the frame and projecting outward away from the frame and adsorbent material, wherein the plurality of tabs are spaced apart from each other on the outer edges of the frame;
wherein the first portion has a flange formed on an outer edge of frame of the first portion;
wherein the plurality of tabs and the flange each have one or more apertures configured to receive mounting pins therethrough to mount the adsorber to an interior of an air intake system, the one or more apertures configured to receive one or more pins which are deformed so as to form an interfering lip in an affixed configuration; and wherein the frame surrounds and captures the adsorbent material within the frame, the frame having one or more apertures configured to receive mounting pins therethrough to mount the adsorber into an interior of an air intake system, the one or more apertures configured to receive one or more pins which are deformed so as to form an interfering lip in an affixed configuration; and wherein the adsorbent material is contained in the frame in such a manner that removal of the adsorbent material from the frame would result in destruction of the frame.

10. The adsorber containment and support system of claim 9, wherein
the first portion and a second portion are connected to one another about a corresponding edge.

11. The adsorber containment and support system of claim 10, wherein
the first portion and a second portion are rotationally connected.

12. The adsorber containment and support system of claim 10, wherein
the first portion is provided with an open support matrix provided across a surface thereof, the open support matrix being configured to provide structural support to the adsorbent material while allowing contact between the adsorbent material and air passing thereby.

13. The adsorber containment and support system of claim 10, further comprising
a plurality of corresponding apertures provided about an opposing edge of the first portion and an opposing edge of the second portion.

14. The adsorber containment and support system of claim 13, wherein
the one or more apertures align in a closed configuration so as to receive one or more pins configured to extend therethrough and maintain the frame in a closed configuration, and
wherein the one or more pins are heat staked so as to mushroom at least one end and thus create an interfering lip which cannot pass through an associated one or more corresponding apertures through which each pin extends.

15. The adsorber containment and support system of claim 10, wherein
an opposing edge of the first portion and an opposing edge of the second portion are welded together in a closed orientation.

16. The adsorber containment and support system of claim 10, wherein
the corresponding edge of the first portion and the second portion is provided as a film hinge.

17. A method of providing an adsorber within an engine air intake system, the method comprising:
providing a housing, the housing including an inlet and an outlet, the outlet being configured to be affixed to an intake of an engine, the housing including one or more pins;
providing a frame, the frame having a first portion and a second portion forming a cavity therebetween;
providing an adsorbent material;
placing the adsorbent material into the cavity;
providing a plurality of corresponding apertures about the frame;

extending the one or more pins through one or more of the plurality of corresponding apertures;

affixing the frame to an interior of the housing in a permanent manner by deforming the one or more pins so as to form an interfering lip about a distal portion thereof so as to retain a relative position between the frame and the housing;

wherein the frame extends only about a portion of an interior perimeter of the housing providing a free bypass between the inlet and the outlet;

wherein air escaping from the outlet in a reverse flow condition is configured to come into contact with the adsorbent material contained within the frame such that hydrocarbons contained in the air are adsorbed by the adsorbent material;

wherein the adsorbent material is contained in the frame in such a manner that removal of the adsorbent material from the frame would result in destruction of the frame or housing.

18. The method of providing an adsorber within an engine air intake system of claim 17, wherein
the pins are deformed by means of a heat staking process.

19. The method of providing an adsorber within an engine air intake system of claim 17, further comprising:
welding an opposing edge of the first portion and an opposing edge of the second portion into an interior of the housing with the frame being in a closed position.

* * * * *